(12) United States Patent
Li

(10) Patent No.: US 7,688,334 B2
(45) Date of Patent: Mar. 30, 2010

(54) METHOD AND SYSTEM FOR VIDEO FORMAT TRANSFORMATION IN A MOBILE TERMINAL HAVING A VIDEO DISPLAY

(75) Inventor: Weidong Li, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 482 days.

(21) Appl. No.: 11/353,900

(22) Filed: Feb. 14, 2006

(65) Prior Publication Data

US 2007/0188515 A1     Aug. 16, 2007

(51) Int. Cl.
    *G06T 15/00*        (2006.01)
(52) U.S. Cl. ........................ 345/604; 345/503; 345/582; 348/453; 348/488; 382/298
(58) Field of Classification Search .................. 345/604, 345/600, 582, 503; 348/453, 488, 441; 382/298
See application file for complete search history.

(56) References Cited

U.S. PATENT DOCUMENTS

| | | | | |
|---|---|---|---|---|
| 6,538,656 B1 * | 3/2003 | Cheung et al. | ............... | 345/519 |
| 6,538,659 B2 * | 3/2003 | Fujimura et al. | ............ | 345/582 |
| 6,674,479 B2 * | 1/2004 | Cook et al. | .................. | 348/453 |
| 7,002,627 B1 * | 2/2006 | Raffy et al. | .................. | 348/273 |

* cited by examiner

*Primary Examiner*—Phu K Nguyen
(74) *Attorney, Agent, or Firm*—McAndrews, Held & Malloy, Ltd.

(57) ABSTRACT

Methods and systems for video format transformation in a mobile terminal having a video display may include converting interleaved YUV 4:2:2 color space video data to YUV 4:2:0 color space video data as the interleaved YUV 4:2:2 color space video data is received. The conversion may use Y, U, and V components in the interleaved YUV 4:2:2 color space video data for a horizontal line of video data. The conversion may also use only a Y component in the interleaved YUV 4:2:2 color space video data for a previous horizontal line or a successive horizontal line of video data. The converted 4:2:0 color space video data may be transferred to memory via, for example, direct memory access. The YUV 4:2:0 color space video data may be transferred to the memory as, for example, 32-bit words.

28 Claims, 10 Drawing Sheets

| 410 | | | | | | | | | | | | | | | |
|---|---|---|---|---|---|---|---|---|---|---|---|---|---|---|---|
| Y | U | Y | V | Y | U | Y | V | Y | U | Y | V | Y | U | Y | V |
| 410a | 410b | 410c | 410d | 410e | 410f | 410g | 410h | 410i | 410j | 410k | 410l | 410m | 410n | 410o | 410p |

| 412 | | | | | | | | | | | | | | | |
|---|---|---|---|---|---|---|---|---|---|---|---|---|---|---|---|
| Y | U | Y | V | Y | U | Y | V | Y | U | Y | V | Y | U | Y | V |
| 412a | 412b | 412c | 412d | 412e | 412f | 412g | 412h | 412i | 412j | 412k | 412l | 412m | 412n | 412o | 412p |

FIG. 4a

METHOD AND SYSTEM FOR VIDEO FORMAT TRANSFORMATION IN A MOBILE TERMINAL HAVING A VIDEO DISPLAY

CROSS-REFERENCE TO RELATED APPLICATIONS/INCORPORATION BY REFERENCE

This application makes reference to:
U.S. application Ser. No.11/353,686 filed on even date herewith; and
U.S. application Ser. No. 11/354,704 filed on even date herewith.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to video signal processing. More specifically, certain embodiments of the invention relate to a method and system for video format transformation in a mobile terminal having a video display.

BACKGROUND OF THE INVENTION

When transmission of color TV signals were developed, a decision was made to have the broadcast equipment transmit one set of color signals that could be decoded by black and white TVs to show black and white images, and by color TVs to display color images. The resulting color encoding was called YUV format, and television broadcasters worldwide adopted this system. The signals in the YUV format are derived from the RGB format. The RGB color format is the format captured by the analog and digital cameras.

The Y channel in YUV is the "luma" or luminance channel, which carries brightness information, and is a sum of the R, G, and B color signals. The black and white TV sets decode only the Y part of the signal. The U and V channels in the YUV are the chroma channels of the YUV format, and carry the color information. Accordingly, the color TV sets will decode all three color components. The U channel carries blue minus luma (B-Y) information, and the V channel carries red minus luma (R-Y) information. Through a process called "color space conversion," the video camera converts the RGB data captured by its sensors into either composite analog signals (YUV) or component versions (analog YPbPr or digital YCbCr). For rendering on a TV screen, these color spaces must be converted back again to RGB by the TV or display system. Various standardized equations are used for converting RGB to YUV.

The original TV standard combined the luma (Y) channel and both chroma channels (U and V) into one channel, which is known as "composite video." An option known as "S-video" or "Y/C video" keeps the luma channel separate from the color channels, using one cable, but with separate wires internally. S-video provides a bit sharper images than composite video. When the luma channel and each of the color channels (B-Y and R-Y) are maintained separately, it is called "component video." Component video is designated as YPbPr when in the analog domain and YCbCr when in the digital domain. In practice, YUV refers to the color difference encoding format whether composite or component, and "YUV," "Y, B-Y, R-Y" and "YPbPr" are used interchangeably for analog signals. Sometimes, "YCbCr," which is digital, is used interchangeably as well.

The primary advantages of the YUV system are that it remains compatible with black and white analog television. Another advantage of YUV system is that some of the information may be discarded in order to reduce bandwidth. The human eye has fairly low color sensitivity. That is, the accuracy of the brightness information of the luminance channel has far more impact on the image discerned than information in the other two chrominance channels. Understanding this human shortcoming, standards such as NTSC reduce the amount of data consumed by the chrominance channels considerably, leaving the eye to extrapolate much of the color information. NTSC saves only 11% of the original blue information and 30% of the red information. The green information is usually preserved in the Y channel. Therefore, the resulting U and V channels can be substantially compressed.

Because the human eye is less sensitive to color than intensity, the chroma components of an image need not be as well defined as the luma component, so many video systems sample the chroma channels at a lower sampling frequency than for the luma channel. This reduces the overall bandwidth of the video signal without much apparent loss of picture quality. The missing values will be interpolated or repeated from the preceding sample for that channel.

The subsampling in a video system is usually expressed as a three part ratio. The three terms of the ratio are: the number of brightness ("luminance" "luma" or Y) samples, followed by the number of samples of the two color ("chroma") components: U/Cb then V/Cr, for each complete sample area. For quality comparison, only the ratio between those values is important, so 4:4:4 could easily be called 1:1:1. However, the value for brightness has been set to 4 traditionally, with the rest of the values scaled accordingly. There are other subsampling rates such as 4:2:2 and 4:2:0. Different video subsampling may be used due to different design specifications and/or implementations of different video standards. A problem may occur when a device receives video data with one subsampling rate while video data in that device is processed with another subsampling rate.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for video format transformation in a mobile terminal having a video display, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 4a is an exemplary diagram illustrating 2 horizontal lines of video with YUV 4:2:2 color space format, which may be utilized in connection with an embodiment of the invention.

DETAILED DESCRIPTION OF THE INVENTION

Certain embodiments of the invention may be found in a method and system for video format transformation in a mobile terminal having a video display. Aspects of the method may comprise converting interleaved YUV 4:2:2 color space video data to YUV 4:2:0 color space video data as the interleaved YUV 4:2:2 color space video data is received. The conversion may use Y, U, and V components in the interleaved YUV 4:2:2 color space video data for a horizontal line of video data. The conversion may also use a Y component in the interleaved YUV 4:2:2 color space video data for a previous horizontal line or a successive horizontal line of video data.

The Y, U, and V components may be used from even horizontal lines of the interleaved YUV 4:2:2 color space video data, and the Y component may be used from odd horizontal lines of the interleaved YUV 4:2:2 color space video data. Alternatively, the Y, U, and V components may be used from the odd horizontal lines of the interleaved YUV 4:2:2 color space video data, and the Y component may be used from the even horizontal lines of the interleaved YUV 4:2:2 color space video data.

The converted 4:2:0 color space video data may be transferred to memory, for example, as interleaved video data. Alternatively, the 4:2:0 converted color space video data may be transferred to memory in planar memory format video data. The video data may be transferred, for example, via direct memory access. The YUV 4:2:0 color space video data may be transferred to the memory as, for example, 32-bit words.

The interleaved YUV 4:2:2 color space video data may be received from a line buffer, for example, in 128 bit format. The line buffer may be one of two line buffers. For example, the interleaved YUV 4:2:2 color space video data for a present horizontal line may be received from one of the two line buffers, while the other line buffer may communicate the interleaved YUV 4:2:2 color space video data for a previous horizontal line for conversion to YUV 4:2:0 color space video data. Each of the two line buffers may receive input video data in byte format.

Direct memory access for data transfer to memory may be initiated when one of the two line buffers receiving the interleaved YUV 4:2:2 color space video data for a present horizontal line may be full. The direct memory access may also be initiated when direct memory access transfers are completed for data corresponding to the interleaved YUV 4:2:2 color space video data for at least one of the Y and U components.

Figure 1:
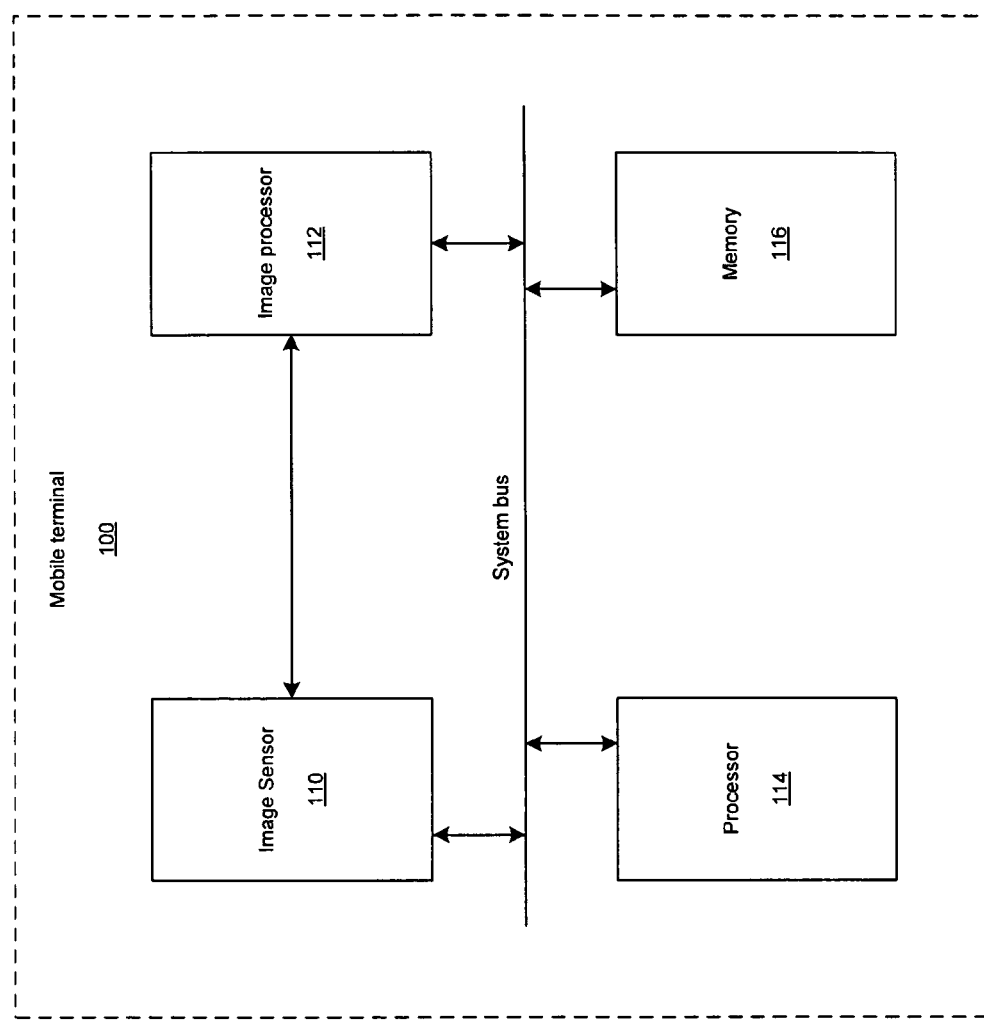
FIG. 1 is an exemplary diagram of a portion of a mobile terminal, which may be utilized in connection with an embodiment of the invention.

FIG. 1 is an exemplary diagram of a portion of a mobile terminal, which may be utilized in connection with an embodiment of the invention. Referring to FIG. 1, there is shown a mobile terminal 100. The mobile terminal 100 may comprise an image sensor 110, an image processor 112, a processor 114, and a memory block 116. The image sensor 110 may comprise suitable circuitry and/or logic that may enable capture of light intensity at a plurality of colors, such as, for example, red, green, and blue. The captured light intensity levels may be further processed as video and/or still photograph outputs. These color levels may be converted to the YUV color space and the resulting color information may be communicated to, for example, the image processor 112 for further processing.

The image processor 112 may comprise suitable circuitry and/or logic that may enable processing of YUV information. The YUV information may be processed so that all Y data may be stored in one logical portion of, for example, the memory block 116, all U data may be stored in another portion of the memory block 116, and all V data may be stored in a third portion of the memory block 116. Accordingly, the luminance portion Y, and the chrominance information U and V may be processed separately.

The processor 114 may determine the mode of operation of various portions of the mobile terminal 100. For example, the processor 114 may set up data registers in the image processor block 112 to allow direct memory access (DMA) transfers of video data to the memory block 116. The processor may also communicate instructions to the image sensor 110 to initiate capturing of images. The memory block 116 may be used to store image data that may be processed and communicated by the image processor 112. The memory block 116 may also be used for storing code and/or data that may be used by the processor 114. The memory block 116 may also be used to store data for other functionalities of the mobile terminal 100. For example, the memory block 114 may store data corresponding to voice communication.

In operation, the processor 114 may initiate image capture by the image sensor 110. The image sensor 110 may communicate the YUV data corresponding to the captured images to the image processor 112. The processor 114 may provide information to the image processor 112 for DMA transfer of processed video data to the memory block 116. The video data in the memory block 116 may be further processed by, for example, the processor 114. The operation of the image processor 112 is discussed in more detail with respect to FIG. 2.

Figure 2:
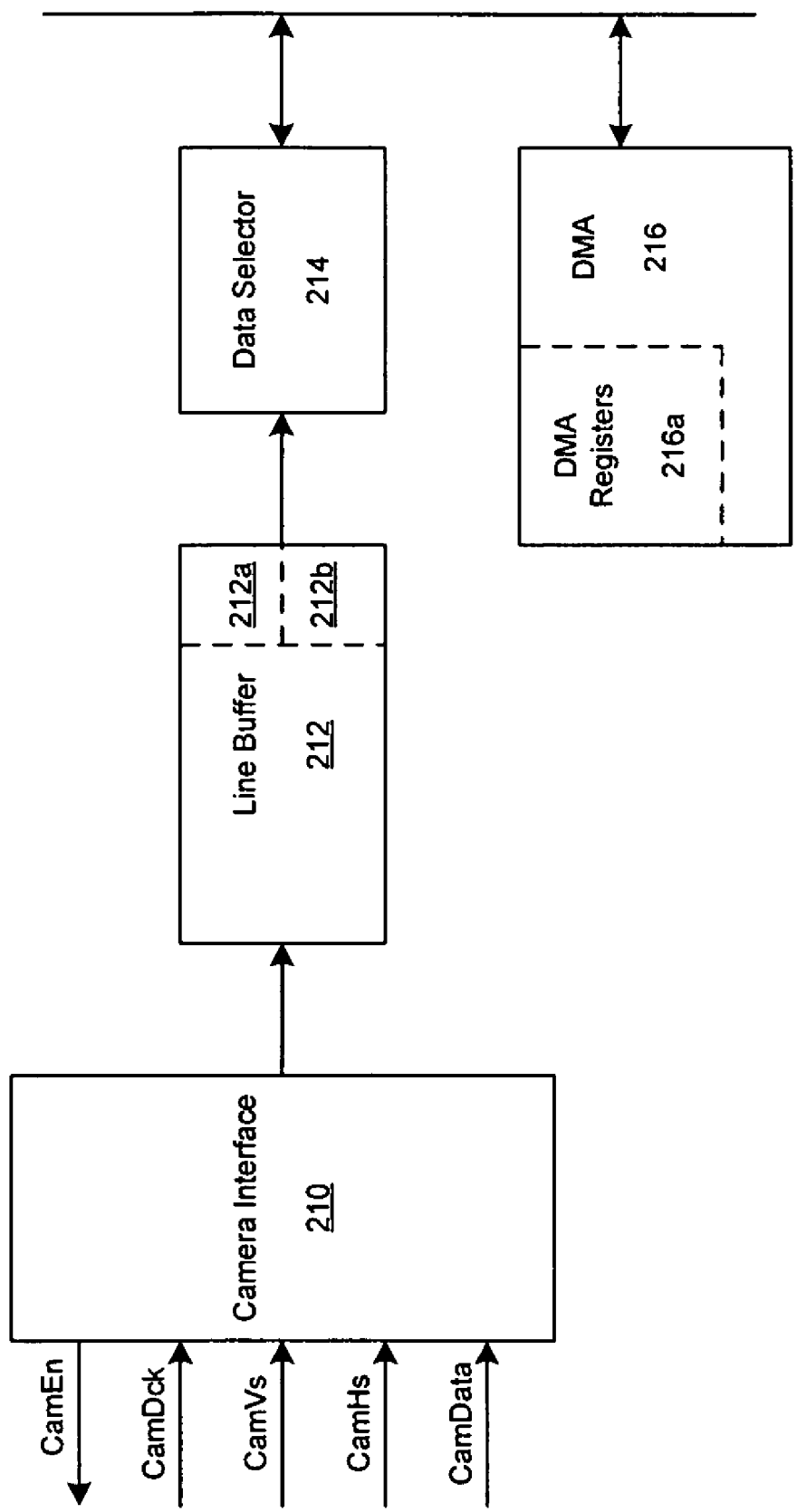
FIG. 2 is a block diagram illustrating an exemplary image processor, in accordance with an embodiment of the invention.

FIG. 2 is a block diagram illustrating an exemplary image processor, in accordance with an embodiment of the invention. Referring to FIG. 2, there is shown a camera interface block 210, a line buffer block 212, a data selector block 214, and a DMA block 216. The DMA block 216 may comprise a DMA register block 216a. The camera interface block 210 may comprise suitable circuitry, logic, and/or code that may enable reception of video data from the image sensor 110. The camera interface block 210 may communicate a camera enable signal CamEn to the image sensor 110. The image sensor 110 may communicate video data CamData, a video data synchronizing clock signal CamDck, a horizontal synchronization signal CamHs, and a vertical synchronization signal CamVs to the camera interface block 210.

The line buffer block 212 may comprise suitable circuitry and/or logic that may enable storing of received image data from the image sensor 110. The line buffer block 212 may comprise, for example, two line buffers 212a and 212b. Video data may be received in, for example, the line buffer 212a while previous video data stored in the line buffer 212b may be processed.

The data selector block 214 may comprise suitable circuitry and/or logic that may enable processing of data communicated by the line buffer block 212. The processing may comprise converting video data in YUV 4:2:2 color space format communicated by the line buffer block 212 to YUV 4:2:0 color space format.

The DMA block 216 may comprise suitable circuitry and/or logic that may enable transferring of data in the data selector block 214 to the memory block 116. A processor, for example, the processor 114, may write to the DMA register block 216a in the DMA block 216 the number of words to DMA transfer and the memory address to write those words to. An embodiment of the invention may comprise DMA transfer of 32-bit words.

In operation, the processor 114 may indicate via an asserted camera enable signal CamEn that the image sensor 110 may start capturing images. The image sensor 110 may enable the circuitry to capture the intensity levels of the images for various colors, for example, red, green, and blue. These color intensity levels may be converted to YUV 4:4:4 color space format, which may be an uncompressed format. This format may then be compressed to the YUV 4:2:2 color space format. Alternatively, the image sensor 110 may directly output YUV 4:2:2 color space format.

The image data in the YUV format may be communicated to the image processor 112 as video data CamData, which may comprise, for example, 8 bits. Each 8 bits may comprise Y, U, or V information. The image sensor 110 may also communicate a video data synchronizing clock signal CamDck that may be utilized by the Camera Interface block 210 to latch the 8 bits of video data CamData when the data are valid. The image sensor 110 may also communicate a horizontal synchronization signal CamHs and a vertical synchronization signal CamVs to the camera interface block 210 in order to indicate end of a horizontal line and end of a frame, respectively.

The line buffer 212 may store pixel information for a present horizontal line in a line buffer 212a or 212b. When the line buffer 212a or 212b is full, the other line buffer 212b or 212a, respectively, may be used to store pixel information for the next video line. For example, the horizontal synchronization signal CamHs may indicate when to switch to the other line buffer. The line buffer that is not receiving data from the image sensor may provide data to the data selector block 214.

An embodiment of the invention may comprise transferring, for example, 128 bits of data at a time from the line buffer block 212 to the data selector block 214. In this manner, the line buffer block 212 may receive image data for a present line from the image sensor 110, while providing image data for a previous line to the data selector block 214. The data selector block 214 may select appropriate bytes of data for converting the YUV 4:2:2 color space format to the YUV 4:2:0 color space format. The DMA block 216 may read the data from the data selector block 214. The DMA block 216 may then DMA transfer the data to the memory block 116. This is described in more detail with respect to FIG. 4b.

Figure 3A:
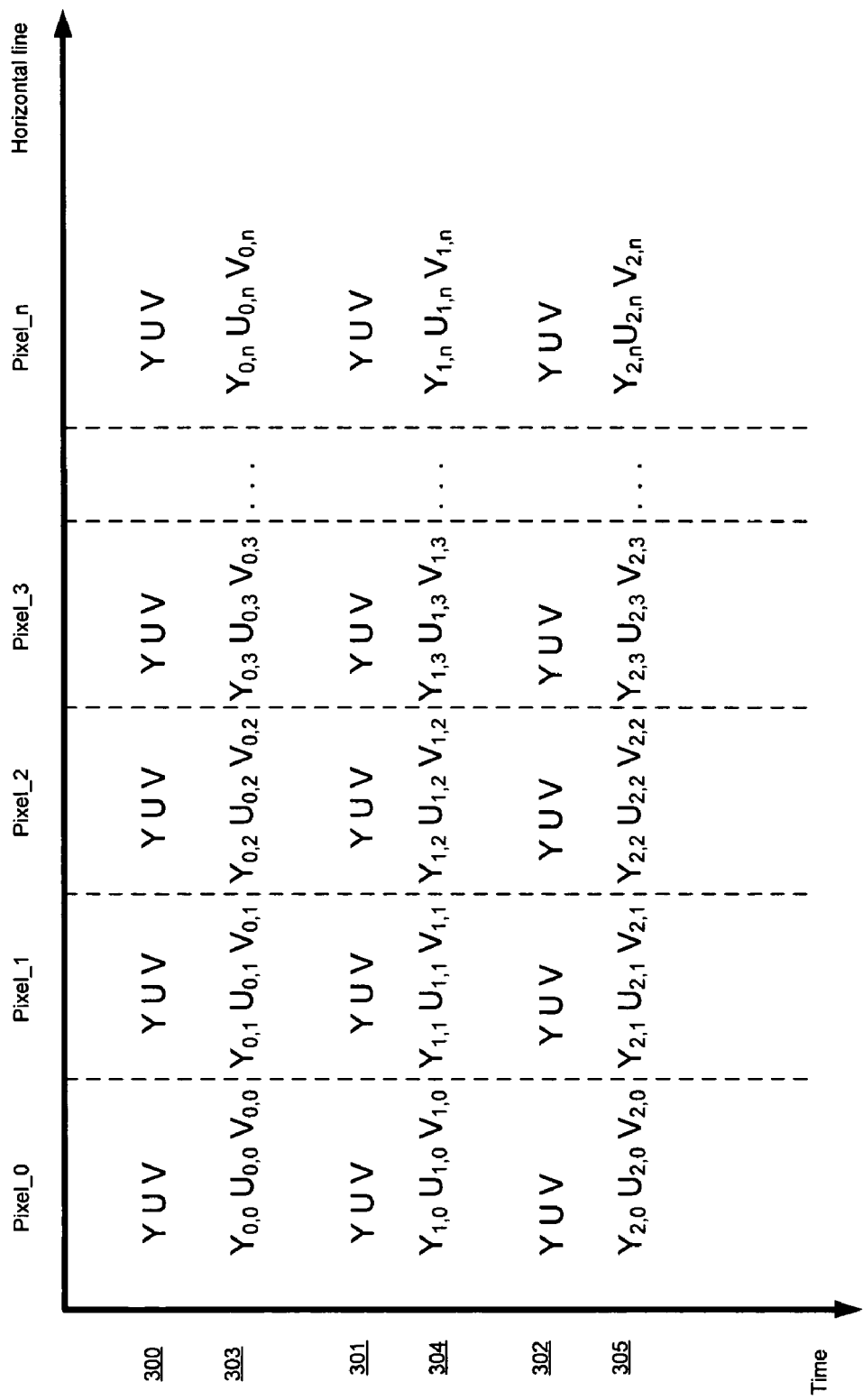
FIG. 3a is an exemplary diagram illustrating 4:4:4 subsampling, which may be utilized in connection with an embodiment of the invention.

FIG. 3a is an exemplary diagram illustrating 4:4:4 subsampling, which may be utilized in connection with an embodiment of the invention. Referring to FIG. 3a, there is shown a sequence of pixel positions for three horizontal lines 300, 301, and 302. There is also shown the horizontal lines 303, 304, and 305, where each pixel may specify information for the three channels Y, U, and V. Since the YUV 4:4:4 color space format is uncompressed, each pixel in the three horizontal lines 303, 304, and 305 may have the same information as each corresponding pixel in the horizontal lines 300, 301, and 302.

The Y, U, and V channel information in the horizontal lines 303, 304, and 305 may correspond to each pixel position for the n+1 video pixels for the three horizontal lines 300, 301, and 302. Each pixel may have, for example, 3 bytes associated with it, where one byte may correspond to the Y luminance data, another byte may correspond to U chrominance data, and the third byte may correspond to V chrominance data. Each pixel component Y, U, or V may be denoted by 2 numbers. The two numbers may indicate the line position and pixel position that the channel information is from.

Figure 3B:
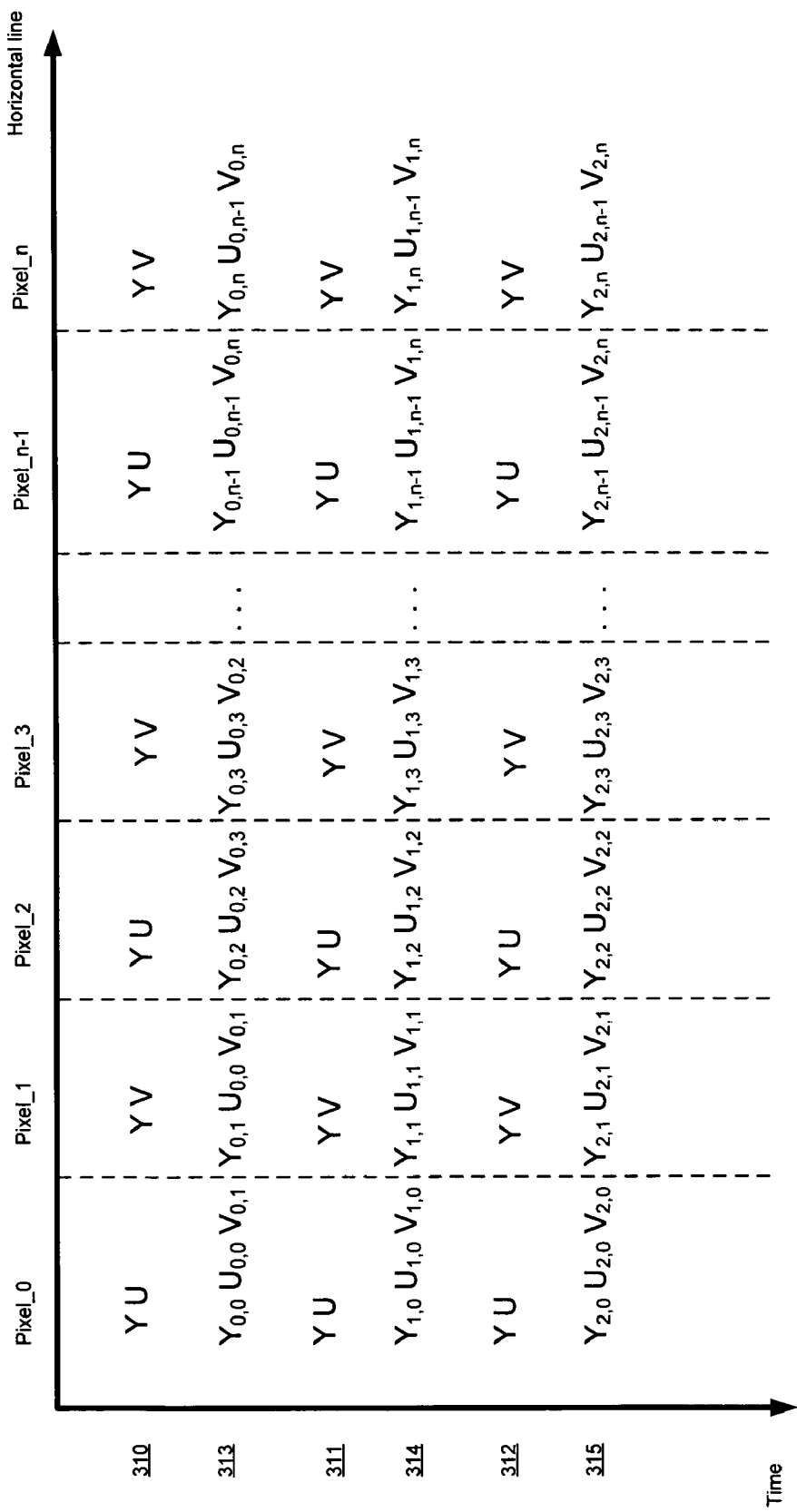
FIG. 3b is an exemplary diagram illustrating 4:2:2 subsampling, which may be utilized in connection with an embodiment of the invention.

FIG. 3b is an exemplary diagram illustrating 4:2:2 subsampling, which may be utilized in connection with an embodiment of the invention. Referring to FIG. 3b, there is shown a sequence of pixels for three horizontal lines 310, 311, and 312 where each pixel may be missing information for either the U or V channel. There is also shown the horizontal lines 313, 314, and 315, where each pixel may specify information for each of the three channels Y, U, and V, where information for the missing channel U or V may have been recreated. The YUV 4:2:2 color space format may be a compressed format, where the Y channel may not be compressed. However, the U and V channel may be compressed by sampling at ½ the sampling rate of the Y channel for every line. For example, odd pixels may have U channel information while even pixels may have V channel information. Therefore, the horizontal lines 310, 311, and 312 may comprise the compressed YUV 4:2:2 color space format lines, while the horizontal lines 313, 314, and 314 may comprise horizontal lines after decompression.

The Y, U, and V channel information for each of the n+1 pixels in the horizontal lines 313, 314, and 315 may correspond to the n+1 pixels for the three horizontal lines 310, 311, and 312. Each pixel I the horizontal lines 313, 314, and 315 may have, for example, 3 bytes associated with it, where one byte may correspond to the Y channel, another byte may correspond to U channel, and the third byte may correspond to V channel. Each pixel channel Y, U, or V may be denoted by 2 numbers. The two numbers may indicate the line position and pixel position, respectively, that the channel information is from. Line numbers 0, 1, and 2 may correspond to the horizontal lines 310, 311, and 312, respectively.

However, since each pixel in the horizontal lines 310, 311, and 312 may have associated with it channel Y information and one of the U or V channel information, the missing information may need to be recreated. One way to recreate the missing chrominance information may be to duplicate the information from a neighboring pixel.

For example, Pixel_0 and Pizel_1 in the first horizontal line 310 may correspond to the Pixel_0 and Pixel_1 in the horizontal line 312. Pixel_0 in the horizontal line 310 may have Y channel information and U channel information, while Pixel_1 in the horizontal line 310 may have Y channel information and V channel information. In order to recreate the missing V channel information for the Pixel_0, the V channel information from the next pixel Pixel_1 may be duplicated. Similarly, to recreate the missing U channel information for the Pixel_1, the U channel information from the previous pixel Pixel_0 may be duplicated.

Accordingly, the Pixel_0 may have the 3 channels denoted as $(Y_{0,0}U_{0,0}V_{0,1})$ where $Y_{0,0}$ and $U_{0,0}$ may indicate that the information for the Y and U channels may be from the Pixel_0 in the horizontal line 310. $V_{0,1}$ may indicate that the information for the V channel may be from Pixel_1 in the horizontal line 310. Similarly, the Pixel_1 may have the 3 channels denoted as $(Y_{0,1}U_{0,01}V_{0,1})$ where $Y_{0,1}$ and $V_{0,1}$ may indicate that the information for the Y and V channels may be from the Pixel_1 in the horizontal line 310. $U_{0,0}$ may indicate that the information for the U channel may be from Pixel_0 in the horizontal line 310. In this manner, each pixel in a horizontal line may recreate information for the U channel or V channel as needed. If there is an odd number of pixels, and the last pixel needs to recreate information for the V channel, the information from the previous pixel may be copied.

Figure 3C:
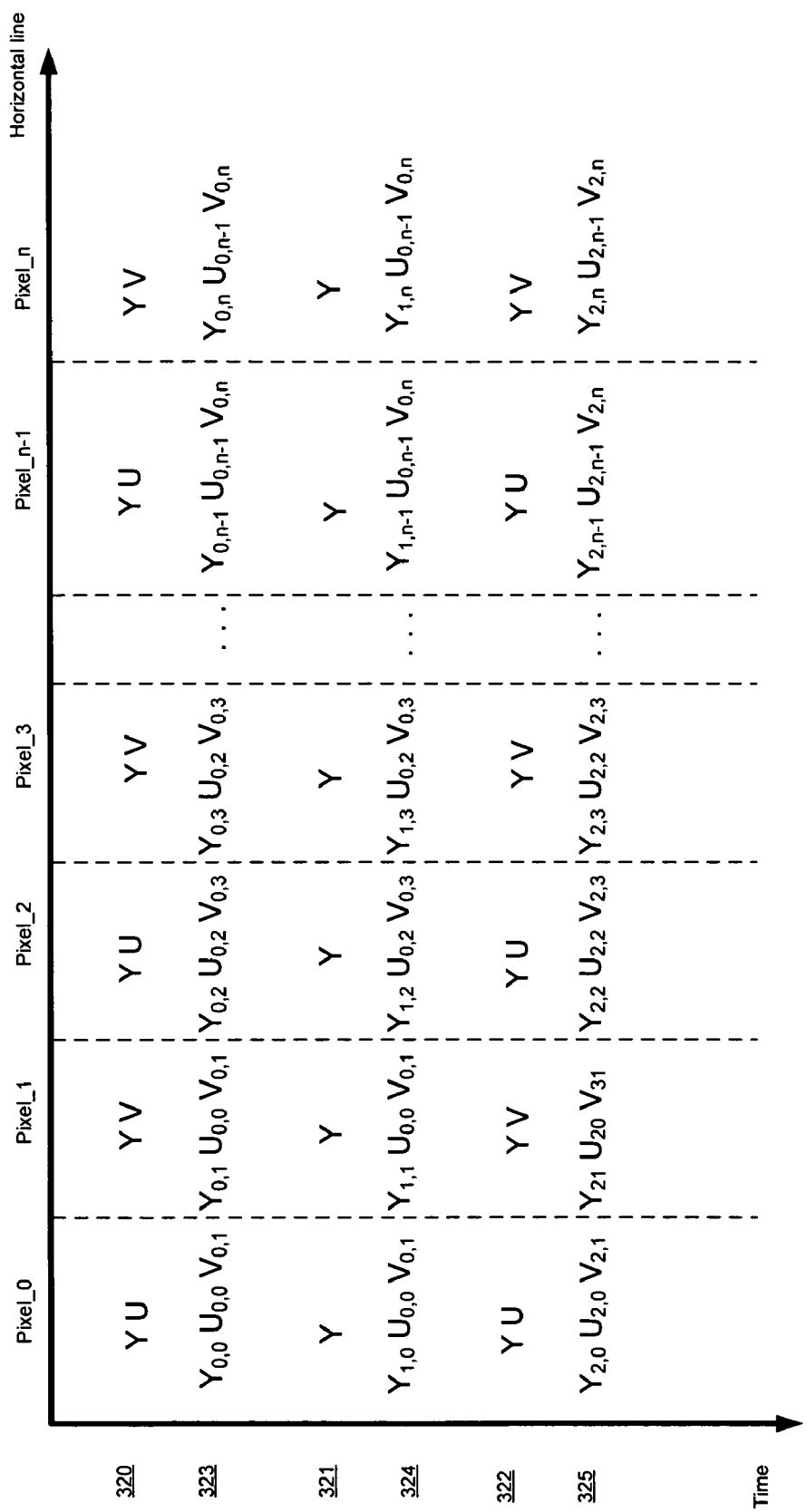
FIG. 3c is an exemplary diagram illustrating 4:2:0 subsampling, which may be utilized in connection with an embodiment of the invention.

FIG. 3c is an exemplary diagram illustrating 4:2:0 subsampling, which may be utilized in connection with an embodiment of the invention. Referring to FIG. 3c, there is shown a sequence of pixels for three horizontal lines 320, 321, and 322 where each pixel in the horizontal lines 320 and 322 may not have information for all three channels Y, U, and V. There is also shown the horizontal lines 323, 324, and 325, where each pixel may specify information for each of the three channels Y, U, and V, where information for the missing channels U and/or V may have been recreated from other pixels.

The YUV 4:2:0 color space format may be a compressed format, where information for the U and V channels may be compressed. The U and V channel may be compressed by sampling at ½ the sampling rate of the Y channel for every line. Additionally, alternating lines may not have any U and V information at all for any pixel. For example, every even pixel Pixel_0, Pixel_2, . . . , Pixel_n−1 may have U channel information while every odd pixel Pixel_1, Pixel_3, . . . , Pixel_n may have V channel information for even horizontal lines 320 and 322, while odd horizontal line 321 may have Y channel information for each pixel. The horizontal lines 320, 321, and 322 may comprise the compressed YUV 4:2:0 color space format horizontal lines, while the horizontal lines 323, 324, and 324 may comprise horizontal lines after decompression. While even and odd is used to describe certain pixels and horizontal lines, these words are only used for exemplary purposes. The invention is not limited by the use of the terms even and odd.

The Y, U, and V channel information in the horizontal lines 323, 324, and 325 may correspond to each pixel position Pixel_0, . . . , Pixel_n for the n+1 video pixels for the three horizontal lines 320, 321, and 322. Each pixel may have, for example, 3 bytes associated with it, where one byte may correspond to the Y luminance data, another byte may correspond to U chrominance data, and the third byte may correspond to V chrominance data. Each pixel channel Y, U, or V may be denoted by 2 numbers. The two numbers may indicate the line position and pixel position that the channel information is from. Line numbers 0, 1, and 2 may correspond to the horizontal lines 320, 321, and 322, respectively. Pixel numbers 0, . . . , n may correspond to the pixel positions Pixel_0, . . . , Pixel_n.

The horizontal lines where each pixel has Y channel information and either a U channel or V channel information may be decompressed similarly as for the YUV 4:2:2 color space format described with respect to FIG. 3b. For example, the horizontal lines 320 and 322 may be decompressed to form the horizontal lines 323 and 325. Horizontal lines where each pixel may only have Y channel information may duplicate the channel information from the previous line. For example, the Pixel_0 in the horizontal line 321 may Y channel information that corresponds that pixel. However, since there is no U or V channel information for Pixel_0 in the horizontal line 321, the U and V channel information may be the same as the corresponding pixel in the previous line, for example, Pixel_0 in line 323.

Accordingly, the decompressed Pixel_0 in the horizontal line 324 may be denoted as $(Y_{1,0}U_{0,0}V_{0,1})$. The Y channel information may be from the Pixel_0 of the horizontal line 321, the U channel information may be the information in Pixel_0 of the previous decompressed horizontal line 323.

FIG. 4a is an exemplary diagram illustrating 2 horizontal lines of video with YUV 4:2:2 color space format, which may be utilized in connection with an embodiment of the invention. Referring to FIG. 4a, there is shown two horizontal lines of video 410 and 412 with 128-bits of video data in each horizontal line 410 and 412. The horizontal lines 410 and 412 may have been generated using the YUV 4:2:2 color space format. The two horizontal lines 410 and 412 may comprise video data that may be in the line buffer block 212. The line buffer block 212 may communicate, for example, 128 bits of the video data at a time to the data selector block 214. In this exemplary embodiment of the invention, 128-bits of video data in each of the horizontal lines 410 and 412 may comprise 8 pixels, where each pixel may comprise 2 bytes of information. One byte of information for each pixel may comprise information for the Y channel, and the other byte of information for each pixel may comprise information for either the U or the V channel. Accordingly, each horizontal line may have the same amount of information for the Y channel, and the U and V channels, as any other horizontal line.

The channel information may be communicated, for example, from the image sensor 110 to the image processor 112 one byte at a time. Accordingly, the image sensor 110 may communicate first the Y channel information 410a, then the U channel information 410b, then the Y channel information 410c, then the V channel information 410d, and so on, for the remaining 128-bits of the horizontal line 410. After communicating all the information for the horizontal line 410, the information for the horizontal line 412 may be similarly communicated to the image processor 112. The line buffer block 212 in the image processor 112 may communicate, for example, 128 bits of video data at a time to the data selector block 214. The number of bits communicated to the data selector block 214 may be design dependent.

Figure 4B:
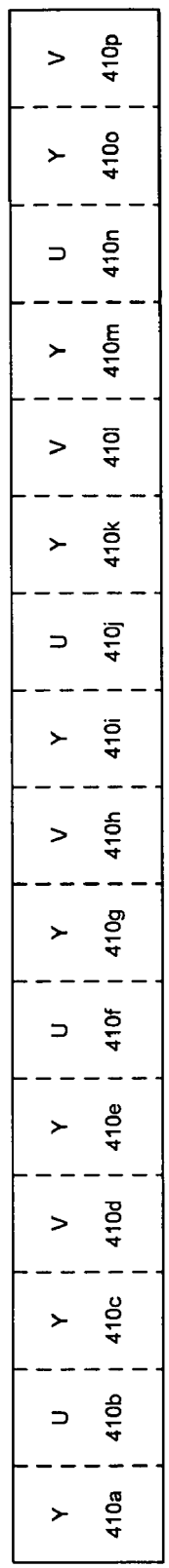
FIG. 4b is an exemplary diagram illustrating 2 horizontal lines of video with YUV 4:2:0 color space format, in accordance with an embodiment of the invention.
Figure 4B:
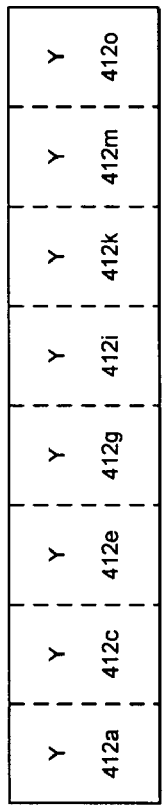

FIG. 4b is an exemplary diagram illustrating 2 horizontal lines of video with YUV 4:2:0 color space format, in accordance with an embodiment of the invention. Referring to FIG. 4b, there is shown horizontal lines of video 420 and 422 that may be generated from the horizontal lines of video 410 and 412 shown with respect to FIG. 4a. Alternate horizontal lines of the YUV 4:2:0 color space format, for example, the even horizontal lines, may have the same video information as corresponding even horizontal lines of the YUV 4:2:2 color space format. Accordingly, if the horizontal line 410 is an even horizontal line, the video information in the 128 bits of video data in the horizontal line 410 may be the same as the 128 bits of video data in the horizontal line 420. Therefore, the video information $410a \ldots 410p$ in the horizontal line 420 may be the video information $410a \ldots 410p$ in the horizontal line 410.

However, the remaining horizontal lines, for example, the odd horizontal lines, may comprise different video information for the YUV 4:2:2 color space format versus the YUV 4:2:0 color space format. Accordingly, the horizontal line 420 may be different from the horizontal line 410 in that all U channel information and V channel information may have been removed. Therefore, the horizontal line 420 may only have the Y channel information 412*a*, 412*c*, 412*e*, 412*g*, 412*i*, 412*k*, 412 *m*, and 412*o*.

The data in the horizontal lines 420 and 422 in the YUV 4:2:0 color space format may be communicated to the DMA block 216, which may store the video data in, for example, the memory block 116. The horizontal lines 420 and 422 in the YUV 4:2:0 color space format may be compressed with respect to the horizontal lines 410 and 412 in the YUV 4:2:2 color space format.

Figure 5:
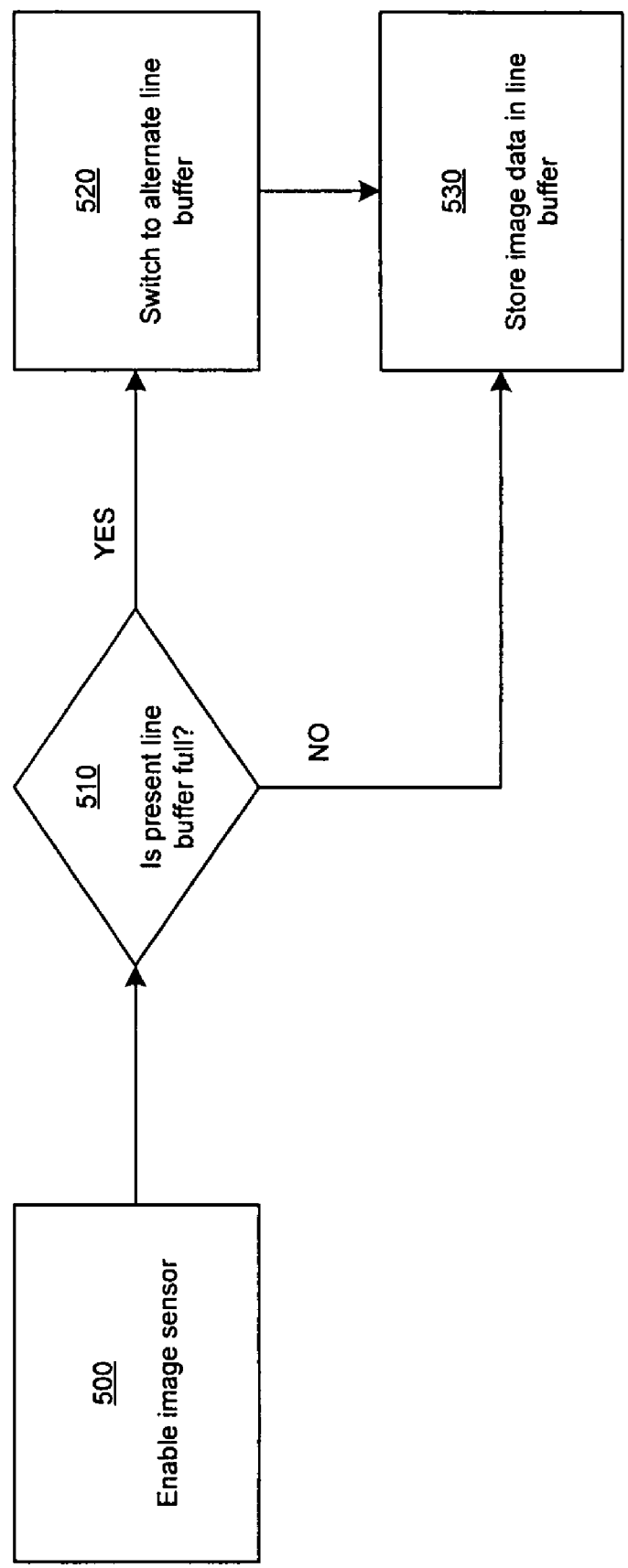
FIG. 5 is an exemplary flow diagram illustrating receiving video data in a line buffer, in accordance with an embodiment of the invention.

FIG. 5 is an exemplary flow diagram illustrating receiving video data in a line buffer, in accordance with an embodiment of the invention. Referring to FIG. 5, there is shown steps 500 to 530. In step 500, the image sensor 110 may be enabled. A processor, for example, the processor 114, may indicate via an asserted camera enable signal CamEn that the image sensor 110 may start capturing images. The image sensor 110 may then communicate image data to the line buffer block 212 via the camera interface block 210.

In step 510, the line buffer block may determine if a line buffer, for example, the line buffer 212*a*, that may be presently receiving the video data may be full. If so, the next step may be step 520. If not, the next step may be step 530. In step 520, the line buffer block 212 may swap line buffers, for example, from the line buffer 212*a* to the line buffer 212*b*. The line buffer 212*a* that was receiving data may be ready to communicate video data in the line buffer to the data selector block 214. In step 520, the other line buffer 212*b* may receive video data from the image sensor 110, and the video data may be stored in the line buffer.

In this manner, one line buffer may receive and store video data from the image sensor 110, and the other line buffer may communicate received video data to the data selector block 114.

Figure 6:
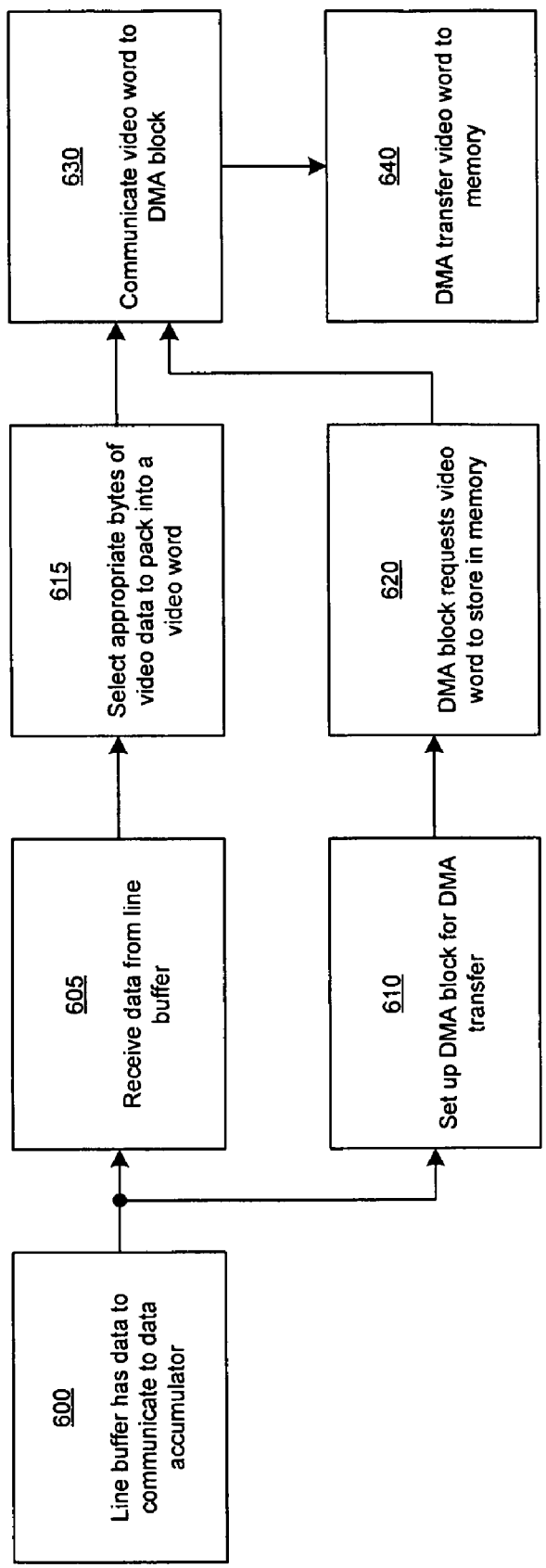
FIG. 6 is an exemplary flow diagram illustrating transforming video data from YUV 4:2:2 color space format to YUV 4:2:0 color space format, in accordance with an embodiment of the invention.

FIG. 6 is an exemplary flow diagram illustrating transforming video data from YUV 4:2:2 color space format to YUV 4:2:0 color space format, in accordance with an embodiment of the invention. Referring to FIG. 6, there is shown steps 600 to 640. In step 600, the line buffer block 212 may have video data ready to transfer to the data selector block 214. In an embodiment of the invention, the line buffer block 212 may, for example, interrupt the processor 114 when it has video data ready to transfer to the data selector block 214. This interrupt may function as an indicator to the processor 114 to set up the DMA block 216 for DMA transfers. The DMA block 216 setup may occur in step 610.

The number of bits of data that may be transferred from the line buffer block 212 to the data selector block 214 may vary depending on implementation of the circuitry. The width of the data transferred may be, for example, multiples of 8 bits since the image sensor 110 may communicate 8 bits of video data at a time to the line buffer block 212. The video data transferred from the line buffer block 212 to the data selector block 214 may be, for example, 128 bits in width.

In step 605, the data selector block 214 may receive video data from the line buffer block 212 as, for example, 128-bit blocks. In step 615, the data selector block 214 may select specific bytes from the 128-bit video data to form, for example, 32-bit words. Since all bytes of the even horizontal lines may be used for the YUV 4:2:0 color space format, the data selector block 214 may select bytes 420*a* . . . 420*p* of the even horizontal lines, for example, the horizontal line 420. However, since only the Y channel information may be desired for the odd horizontal lines using YUV 4:2:0 color space format, for example, the horizontal line 422, the bytes 422*a*, 422*c*, 422*e*, 422*g*, 422*i*, 422*k*, 422*m*, and 422*o* may be selected. Accordingly, the data selector block 214 may select these bytes to form, for example, 32-bit words.

In step 630, the 32-bit word may be communicated from the data selector block 214 to the DMA block 216. The data transfer interface between the data selector block 214 and the DMA block 216 may be, for example, a bus. Accordingly, the DMA block 216 may request a word from the data selector block 214, and the data selector block 214 may respond with a 32-bit word. There may be appropriate handshaking between the data selector block 214 and the DMA block 216 to ensure that the DMA block 216 correctly receives the data. For example, a simple handshake may be a signal from the DMA block 216 to request data, and a signal from the data selector block 214 to indicate that valid data is on the bus.

In step 640, the DMA block 216 may DMA transfer the 32-bit word from the data selector block 214 to a specified location in, for example, the memory block 116. In this manner, the video data in the horizontal lines, for example, the horizontal lines 420 and 422, may be stored in the memory block 216.

From the step 600, the interrupt to the processor 114 may also lead to execution of functionality in step 610. In step 610, the processor 114 may write to the DMA register block 216*a* in the DMA block 216. Some of the registers in the DMA register block 216*a* may be, for example, the word count register and the destination address register. The word count register in the DMA register block 216*a* may hold a value that may indicate the number of words to DMA transfer. When the indicated number of words have been transferred, the DMA block 216 may, for example, assert an interrupt to the processor 114 to indicate that the DMA transfers are completed. The processor 114 may set up another DMA transfer by writing to the DMA register block 216*a*. The destination address register in the DMA register block 216*a* may indicate a start address of, for example, the portion of the memory block 116 to which the DMA transfers may be made. The destination address register may be incremented with each DMA transfer.

In step 620, the DMA block 216, which may be enabled to perform DMA transfers, may request a word to transfer from the data selector block 214. The next step may be step 630.

Figure 7:
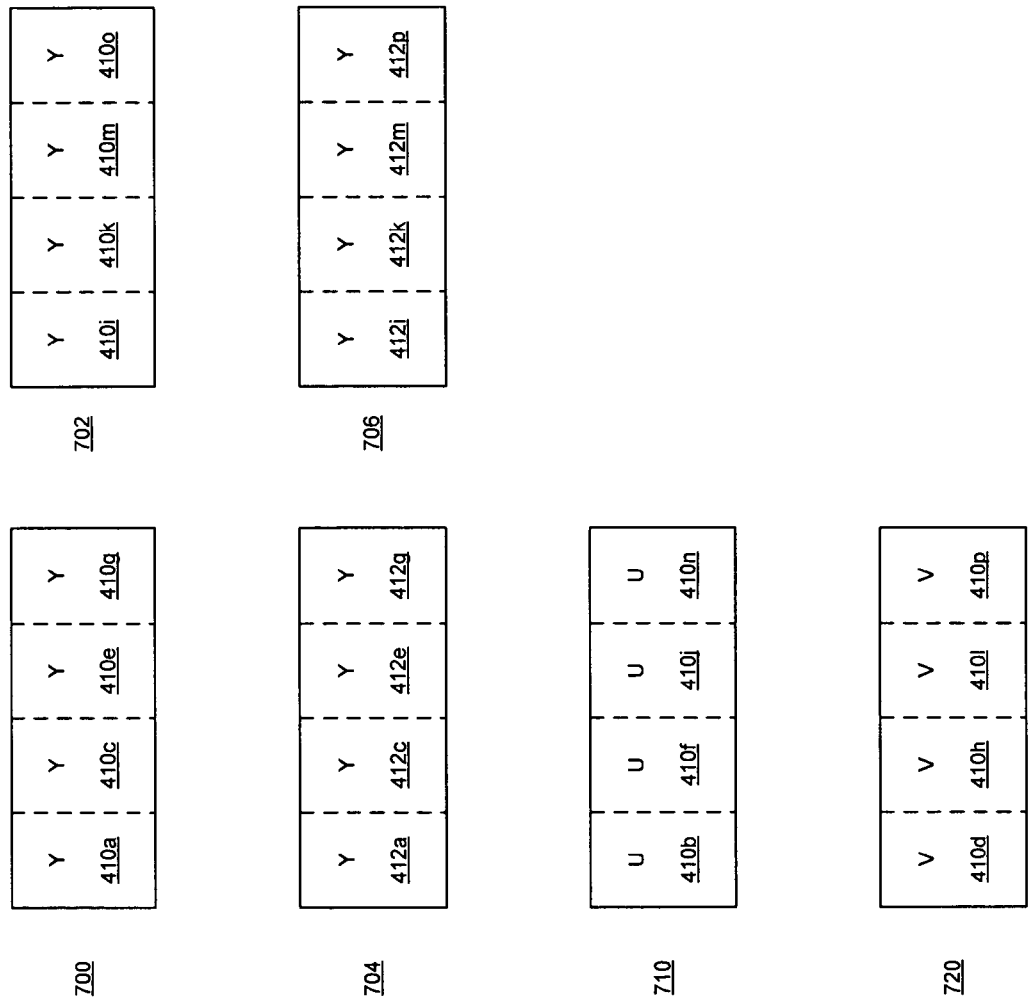
FIG. 7 is an exemplary diagram illustrating planar formatting of video information in two horizontal lines of YUV 4:2:0 color space format converted from interleaved video data in YUV 4:2:2 color space format, in accordance with an embodiment of the invention.

FIG. 7 is an exemplary diagram illustrating planar formatting of video information in two horizontal lines of YUV 4:2:0 color space format converted from interleaved video data in YUV 4:2:2 color space format, in accordance with an embodiment of the invention. Referring to FIG. 7, there is shown Y channel video data words 700, 702, 704, and 706, the U channel video data word 710, and the V channel video data word 720. The video data words 700, 702, 704, 706, 710, and 720 may be extracted from horizontal lines similar to the horizontal lines 410 and 412 shown with respect to FIG. 4*a*.

One set of horizontal lines in the YUV 4:2:0 color space format may have the same Y, U, and V channel information as the corresponding set of horizontal lines in the YUV 4:2:2 color space format. However, the remainder of the horizontal lines in the YUV 4:2:0 color space format may have the same Y channel information as the corresponding horizontal lines in the YUV 4:2:2 color space format, but no U or V channel information. The horizontal line 410 may correspond to a YUV 4:2:0 color space format horizontal line that has the Y, U, and V channel information. The horizontal line 412 may correspond to a YUV 4:2:0 color space format horizontal line that has the Y channel information but no U and V channel information.

Accordingly, the first 4 bytes of Y channel information in the 128 bits of the horizontal line 410 may be gathered as, for example, a 32-bit word 700, and the second 4 bytes of Y channel information in the 128 bits of horizontal line portion 410 may be gathered as, for example, a 32-bit word 702. These two 32-bit words may be stored in the memory block 116 by the DMA block 216. Accordingly, the DMA block 216 may store the Y channel information sequentially in a portion of the memory block 116.

When the line buffer block 212 communicates the horizontal line 400 again, the data selector block 214 may select the U channel information. The pixels of the YUV 4:2:2 color space format may alternate in having U or V channel information. Therefore, the U channel bytes 410*b*, 410*f*, 410*j*, and 410*n* of the horizontal line 400 may be selected. Accordingly, the 4 bytes of the U channel information from the horizontal line 400 may be gathered as a single 32-bit word 710 for DMA transfer to the memory block 116.

When the horizontal line 400 is communicated yet again by the line buffer block 212, the data selector block 214 may select the V channel information. The pixels of the YUV 4:2:2 color space format may alternate in having U or V channel information. Therefore, the V channel bytes 410*b*, 410*f*, 410*j*, and 410*n* of the horizontal line 400 may be selected. Accordingly, the 4 bytes of U channel information from the horizontal line 400 may be gathered as a single 32-bit word 720 for DMA transfer to the memory block 116.

Since all of the Y, U, and V information may have been extracted from the horizontal line 400, the data in the horizontal line 400 may not need to be communicated to the data selector block 214 again. Accordingly, data in the next horizontal line 412 may be communicated to the data selector block 214 when the line buffer block 212 may have received all of the data in the horizontal line 412.

However, since all of the Y, U, and V channel information was extracted from the last horizontal line, only the Y information may need to be extracted from this horizontal line. Accordingly, the eight bytes of Y channel information in the 128 bits of the horizontal line 412 may be gathered as, for example, the 32-bit words 704 and 706. These two 32-bit words may be transferred to the portion of the memory block 116 that may store the Y channel information. Accordingly, the DMA block 216 may store the Y channel information sequentially in a portion of the memory block 116.

The U.S. application Ser. No. 11/353,686 provides a detailed description of planar transformation, and is hereby incorporated herein by reference in its entirety.

In accordance with an embodiment of the invention, aspects of an exemplary system may comprise format conversion circuitry, for example, the data selector block 214, that enables conversion of interleaved YUV 4:2:2 color space video data to YUV 4:2:0 color space video data as the interleaved YUV 4:2:2 color space video data is received. The conversion may comprise using Y, U, and V components, or channels, in the interleaved YUV 4:2:2 color space video data for a horizontal line of video data. The data selector block 214 may make the conversion using the Y component but not the U and V components in the interleaved YUV 4:2:2 color space video data for at least one of a previous horizontal line or a successive horizontal line of video data.

Accordingly, Y, U, and V components may be used from even horizontal lines of the interleaved YUV 4:2:2 color space video data, and Y component may be used from odd horizontal lines of the interleaved YUV 4:2:2 color space video data. Alternatively, Y, U, and V components may be used from the odd horizontal lines of the interleaved YUV 4:2:2 color space video data, and the Y component may be used from the even horizontal lines of the interleaved YUV 4:2:2 color space video data.

The YUV 4:2:0 color space video data may be transferred to the memory, for example, the memory block 116, as interleaved video data. The YUV 4:2:0 color space video data may also be transferred to the memory block 116 as planar memory format video data. The transfer may be done via direct memory access, for example, via the DMA block 216. The DMA block 216 may transfer the YUV 4:2:0 color space video data to the memory block 116 as 32-bit words.

The format conversion circuitry, or the data selector block 214, may receive the interleaved YUV 4:2:2 color space video data from the line buffer 212. The interleaved YUV 4:2:2 color space video data may be received in a 128-bit format from the line buffer block 212. The line buffer block 212 may comprise two line buffers, for example, the line buffer 212*a* and the line buffer 212*b*.

The interleaved YUV 4:2:2 color space video data for a present horizontal line may be received in one of the two line buffers, for example the line buffer 212*a*, while the interleaved YUV 4:2:2 color space video data for a previous horizontal line in the other of the two line buffers, for example, the line buffer 212*b*, may be communicated for conversion to the data selector block 214. Each of the two line buffers 212*a* and 212*b* may receive input video data in byte format. The direct memory access transfers by the DMA block 216 may be initiated when one of the two line buffers, for example, the line buffer 212*a*, receiving the interleaved YUV 4:2:2 color space video data for a present horizontal line is full. The DMA block 216 may initiate direct memory access transfers when direct memory access transfers are completed for at least one of the interleaved YUV 4:2:2 color space channels Y and U.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for processing video signals, the method comprising:

performing via one or more processors and/or circuits within a video processing device:

converting interleaved YUV 4:2:2 color space video data to YUV 4:2:0 color space video data as said interleaved YUV 4:2:2 color space video data is received, said converting comprising:

using Y, U, and V components in said interleaved YUV 4:2:2 color space video data for a horizontal line of video data, wherein, for each pixel in said horizontal line:

video space information comprises Y component data and only one of U component data or V component data, wherein skipping of one of U component data and V component data is alternated in said horizontal line; and a corresponding missing U component data or V component data is subsequently generated using an immediately neighboring pixel; and using only a Y component in interleaved YUV 4:2:2 color space video data for at least one of a previous horizontal line or a successive horizontal line of video data; and transferring said 4:2:0 color space video data to memory.

2. The method according to claim 1, wherein said Y, U, and V components are used from even horizontal lines of said interleaved YUV 4:2:2 color space video data, and said only Y component is used from odd horizontal lines of said interleaved YUV 4:2:2 color space video data.

3. The method according to claim 1, wherein said Y, U, and V components are used from odd horizontal lines of said interleaved YUV 4:2:2 color space video data, and said only Y component is used from even horizontal lines of said interleaved YUV 4:2:2 color space video data.

4. The method according to claim 1, wherein said YUV 4:2:0 color space video data is transferred to said memory as interleaved video data.

5. The method according to claim 1, wherein said YUV 4:2:0 color space video data is transferred to said memory as planar memory format video data.

6. The method according to claim 1, wherein said transferring is done via direct memory access.

7. The method according to claim 1, comprising transferring said YUV 4:2:0 color space video data to said memory as 32-bit words.

8. The method according to claim 1, comprising receiving said interleaved YUV 4:2:2 color space video data from a line buffer.

9. The method according to claim 8, wherein said interleaved YUV 4:2:2 color space video data is received in a 128-bit format from said line buffer.

10. The method according to claim 8, wherein said line buffer is one of two line buffers.

11. The method according to claim 10, comprising receiving said interleaved YUV 4:2:2 color space video data for a present horizontal line in a first of said two line buffers, while communicating said interleaved YUV 4:2:2 color space video data for a previous horizontal line in a second of said two line buffers for said conversion.

12. The method according to claim 11, wherein each of said two line buffers receives input video data in byte format.

13. The method according to claim 11, comprising initiating direct memory access when said first of said two line buffers receiving said interleaved YUV 4:2:2 color space video data for a present horizontal line is full.

14. The method according to claim 11, comprising initiating direct memory access when direct memory access transfers are completed for data corresponding to said interleaved YUV 4:2:2 color space video data for at least one of said Y and U components.

15. A system for processing video signals, the system comprising:

one or more circuits that enable format conversion of interleaved YUV 4:2:2 color space video data to YUV 4:2:0 color space video data as said interleaved YUV 4:2:2 color space video data is received, said conversion by said one or more circuits comprising:

using Y, U, and V components in said interleaved YUV 4:2:2 color space video data for a horizontal line of video data, wherein, for each pixel in said horizontal line:

video space information comprises Y component data and only one of U component data or V component data, wherein skipping of one of U component data and V component data is alternated in said horizontal line; and a corresponding missing U component data or V component data is subsequently generated using an immediately neighboring pixel; and using only a Y component in interleaved YUV 4:2:2 color space video data for at least one of a previous horizontal line or a successive horizontal line of video data; and said one or more circuits enable transfer of said 4:2:0 color space video data to memory.

16. The system according to claim 15, wherein said Y, U, and V components are used from even horizontal lines of said interleaved YUV 4:2:2 color space video data, and said only Y component is used from odd horizontal lines of said interleaved YUV 4:2:2 color space video data.

17. The system according to claim 15, wherein said Y, U, and V components are used from odd horizontal lines of said interleaved YUV 4:2:2 color space video data, and said only Y component is used from even horizontal lines of said interleaved YUV 4:2:2 color space video data.

18. The system according to claim 15, wherein said YUV 4:2:0 color space video data is transferred to said memory as interleaved video data.

19. The system according to claim 15, wherein said YUV 4:2:0 color space video data is transferred to said memory as planar memory format video data.

20. The system according to claim 15, wherein said one or more circuits enable direct memory access to enable said transfer of said 4:2:0 color space video data to said memory.

21. The system according to claim 15, wherein said one or more circuits enable transferring said YUV 4:2:0 color space video data to said memory as 32-bit words.

22. The system according to claim 15, wherein said one or more circuits enable reception of said interleaved YUV 4:2:2 color space video data from a line buffer.

23. The system according to claim 22, wherein said interleaved YUV 4:2:2 color space video data is received in a 128-bit format from said line buffer.

24. The system according to claim 22, wherein said line buffer is one of two line buffers.

25. The system according to claim 24, wherein said interleaved YUV 4:2:2 color space video data for a present horizontal line is received in a first of said two line buffers, while said interleaved YUV 4:2:2 color space video data for a previous horizontal line in a second of said two line buffers is communicated for said conversion.

26. The system according to claim 25, wherein each of said two line buffers receives input video data in byte format.

27. The system according to claim 25, wherein said one or more circuits enable initiating direct memory access when said first of said two line buffers receiving said interleaved YUV 4:2:2 color space video data for a present horizontal line is full.

28. The system according to claim 25, wherein said one or more circuits enable initiating direct memory access when direct memory access transfers are completed for data corresponding to said interleaved YUV 4:2:2 color space video data for at least one of said Y and U components.

* * * * *